United States Patent
Imanaka et al.

[19]

[11] Patent Number: 6,006,884
[45] Date of Patent: Dec. 28, 1999

[54] CLUTCH DISK ASSEMBLY

[75] Inventors: Hideyuki Imanaka, Moriguchi; Hiroshi Kobayashi, Kyoto, both of Japan

[73] Assignee: Exedy Corporation, Osaka, Japan

[21] Appl. No.: 09/151,812

[22] Filed: Sep. 14, 1998

[30] Foreign Application Priority Data

Sep. 30, 1997 [JP] Japan .................................. 9-266972

[51] Int. Cl.$^6$ .................................................. F16D 13/44
[52] U.S. Cl. ........................................ 192/89.26; 192/204
[58] Field of Search .............................. 192/89.26, 204, 192/209, 213.2; 464/68

[56] References Cited

U.S. PATENT DOCUMENTS

| | | | |
|---|---|---|---|
| 5,540,620 | 7/1996 | Haneda et al. | 464/64 |
| 5,609,526 | 3/1997 | Kitayama et al. | 464/68 |
| 5,690,554 | 11/1997 | Imanaka et al. | 464/68 |
| 5,707,290 | 1/1998 | Imanaka | 464/9 |
| 5,893,446 | 4/1999 | Honjo et al. | 192/204 |

*Primary Examiner*—Rodney H. Bonck
*Assistant Examiner*—Tisha D. Waddell
*Attorney, Agent, or Firm*—Shinjyu Global IP Counselors, LLP

[57] ABSTRACT

A clutch disk assembly includes two pieces of friction facings, cushioning plates 12, clutch plate 3, retaining plate 4, a plurality of connecting pins 11, hub and rivets 17. The cushioning plates 12 are disposed side by side in a circular direction between two pieces of friction facings. Each of the cushioning plates 12 includes a cushioning part 16 disposed between two pieces of friction facings, and an installation part 15 in which two holes 15a are formed apart each other in a circular direction. The connecting pins 11 fixedly couple the outer circumferential portions of plates 3 and 4 to each other. The rivets 17 are inserted in the holes 15a to fix the cushioning plates 12 to the outer circumferential edge of the clutch plate 3. The locations of the connecting pins 11 in a circular direction are located between two adjacent holes 15a of the cushioning plates 12 in a circular direction. The locations of the connecting pins 11 reduce the stresses in the installation parts 15 of the cushioning plates 12. At least a part of each of the connecting pins 11 is located farther outwardly in a radial direction than the most inner circumferential edge of the installation parts 15 of each of the cushioning plates 12.

19 Claims, 3 Drawing Sheets

CLUTCH DISK ASSEMBLY

BACKGROUND OF THE INVENTION

1. Field of the Invention

This invention generally relates to a clutch disk assembly. More specifically, the present invention relates a clutch disk assembly which has a plurality of cushioning plates annularly disposed about its outer peripheral portion.

2. Background Information

A clutch disk assembly for a clutch of a car typically includes a pair of disk-like input plates, an output hub having a flange on its outer circumference, and an elastic member disposed between the input plates and the flange of the output plate as to allow limited relative rotation. On the outer peripheral portion of the pair of input plates, a friction connecting part is secured. The friction connecting part has a plurality of cushioning plates and two pieces of friction facings.

Several cushioning plates are annularly disposed along the outer peripheral portion of the clutch disk assembly, and a friction facing is disposed on either side of a group of cushioning plates in an axial direction. Each of the cushioning plates includes an installation part connected to a clutch plate (one of input plates) by rivets, for example, and an elastic part disposed between two pieces of friction facings. The elastic part has a wavy shape and can deform flexibly between the two friction facings.

In a clutch disk assembly with the above-mentioned structure, i.e., with a couple of input plates, the clutch plate and the retaining plate are fixedly coupled to each other at a plurality of positions of their outer circumferences by a plurality of connecting pins (stop pins). The connecting pins (stop pins) extend in an axial direction between the clutch plate and the retaining plate. The connecting pins pass through cutouts formed at the outer circumference of an output hub flange. When the input plate rotates relatively against the output flange by a predetermined angle, the connecting pins prevent the input plate from rotating or twisting more than the angle by the connecting pins engaging the edges of the cutouts.

In the above-mentioned conventional structure, the connecting pins are located very close to the rivets, which fixedly couple the installation parts of the cushioning plates to the clutch plate. In particular, the end part of the connecting pins are inlaid in installation holes of the clutch plate, and are fixedly coupled to the clutch plate by caulking between the installation parts of two adjacent cushioning plates in a circular direction, and inwardly from them in a radial direction.

In such a structure, since the caulking of the connecting pins reinforces the circumferences of the installation holes of the clutch plate, the circumferences are rigid and hard to deform even if it receives a bending stress in an axial direction of the clutch. On the other hand, in connecting or disconnecting the clutch, the above-mentioned elastic parts of the cushioning plates are deformed and ease the shock. Corresponding to the deformation, the installation parts of the cushioning plates are going to be deformed in an axial direction. However, the circumferences of the installation holes of the clutch plate are reinforced as described above. Therefore, when the installation parts of the cushioning plates are deformed, the clutch plate and the rivets near the installation parts are not deformed or inclined according to the deformation of the installation parts. As a result, a large local stress occurs at the circumferences of the rivets of the installation parts, which may possibly result in a crack occurring around one or more of the rivets.

It is possible to overcome the above-mentioned risk, when the connecting pins are far apart from the installation parts inward in a radial direction. In that case, the radial distance between the connecting pins and the center of the disk is short. Therefore, when the connecting pins contact the edge of the cutouts of the flange, the stress applied to the stop pins and the edges of the cutouts increases. This arrangement requires the input plate or the output flange to be strengthened.

In view of the above, there exists a need for a clutch disk assembly which overcomes the above-mentioned problems in the prior art. This invention addresses this need in the prior art as well as other needs, which will become apparent to those skilled in the art from this disclosure.

SUMMARY OF THE INVENTION

An object of the present invention is to provide a clutch disk assembly that reduces the stresses in the installation parts of the cushioning plates in the clutch disk assembly.

A clutch disk assembly in accordance with one aspect of the present invention includes two pieces of annular friction members, cushioning plates, annular first and second plate members, a plurality of fixing members, a hub and rivets.

The cushioning member is formed of a plurality of cushioning plates arranged side by side in a circular pattern between two pieces of annular friction members. Each of the cushioning plates include a cushioning part disposed between two pieces of annular friction members, and an installation part formed at the inner circumferential side of the cushioning part. The installation parts each have two holes spaced apart in a circular direction. The first and second plate members are disposed at the inner circumferential side of two pieces of annular friction pieces and are apart from each other by a predetermined distance in an axial direction. Several fixing members extend in an axial direction and fix both outer circumferences of the first and second plate members each other. A torque from the first and second plate members is input to the hub. The rivet is inserted in a hole of the cushioning plate, and fixes the cushioning plate to the outer circumferential edge of either the first or second plate portion.

Each fixing member is located in a circular direction between two holes of each cushioning plate. At least a part of each fixing member is located more outward in a radial direction than the most inner circumferential edge of the installation part of each cushioning plate.

In the clutch disk assembly of the present invention, the location of a plurality of fixing members is at the middle position in a circular direction between two holes of the cushioning plate. Therefore, the distance between the fixing member and the cushioning plate is long. As a result, the stress around the hole of the cushioning plate is reduced. In addition, since at least a part of the fixing members are located more outward in a radial direction than the most inner circumferential edges of the installation parts of each of the cushioning plates, a risk which is caused by the arrangement of the fixing members on the inner circumferential side hardly happens.

In a clutch disk assembly of the present invention, the inner circumferential edge of the installation parts extend in a circular direction, a cutout extending outward in a radial direction is formed at the middle position in a circular direction of the inner circumferential edge, and each of the fixing members is seated within one of the cutouts.

In a clutch disk assembly of the present invention, each of the fixing members includes a body held in an axial direction between the first and second plate members, and a fixing part extending from the body for fixedly coupling to the first and second plate members together. A part of the body is located more outward in a radial direction than the most inner circumferential edge of the installation part of each cushioning plate.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Figure 1:
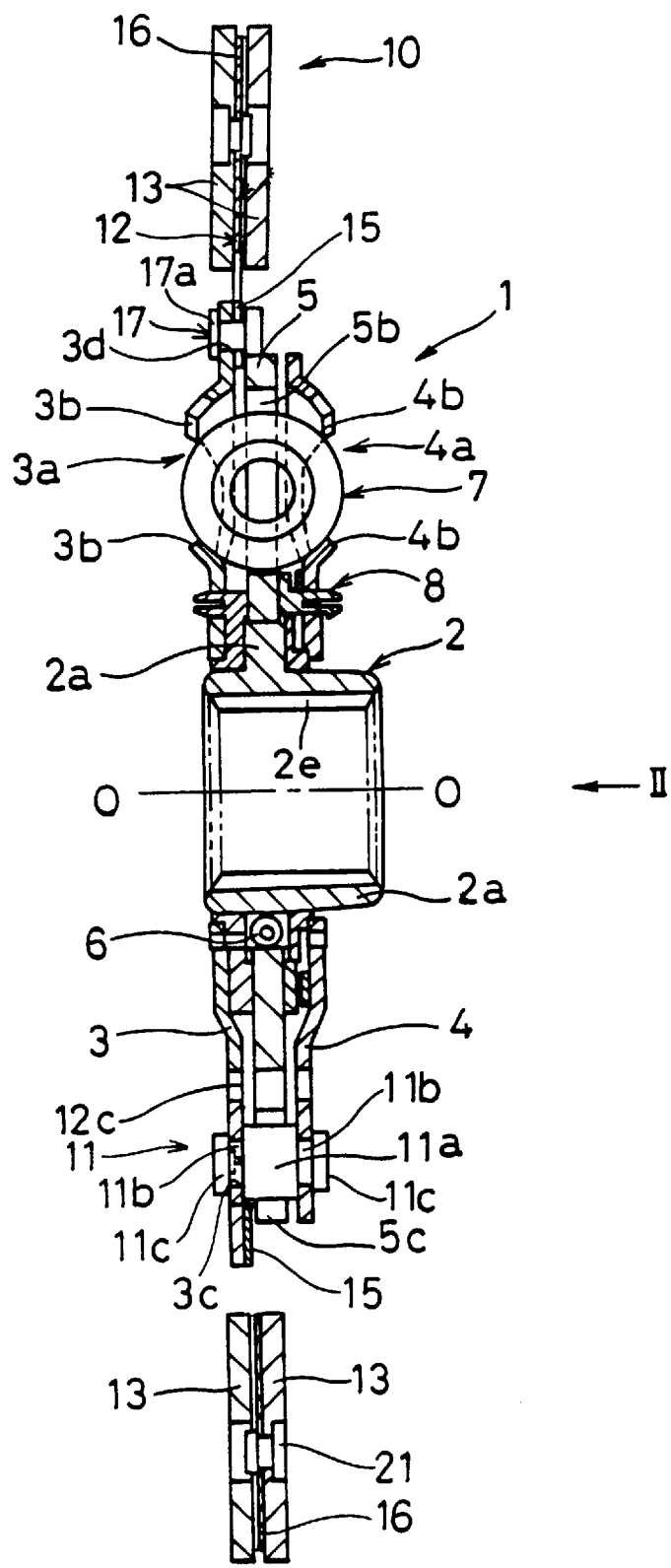
FIG. 1 is a transverse cross-sectional view of a clutch disk assembly in accordance with a first embodiment of the present invention.

Initially referring to FIG. 1, a clutch disk assembly 1 in accordance with one embodiment of the present invention is illustrated. As shown in FIG. 1, the clutch disk assembly 1 is especially adapted to be used in a clutch device of a car. The clutch disk assembly 1 is a device, which is used to transmit or cut off a torque from a crankshaft of an engine (not shown) to a transmission (not shown). As shown in FIG. 1, the engine (not shown) would be disposed on the left side of the clutch disk assembly 1 as viewed in FIG. 1 and the transmission (not shown) would be disposed on the right side of the clutch disk assembly 1 as viewed in FIG. 1. In FIG. 1, the center line O—O represents the rotation axis of the clutch disk assembly 1.

The clutch disk assembly 1 basically includes a hub 2, a clutch plate 3, a retaining plate 4, sub-plate 5, a set of small coil springs 6, a set of large coil springs 7 and a friction generating mechanism 8. The hub 2 is an output member for transmitting the torque to the transmission (not shown). The clutch plate 3 and the retaining plate 4 are first and second plate members that form an input member for transmitting the torque to the engine. The sub-plate 5 is an intermediate member which is located between the clutch plate 3 and the retaining plate 4, and which encircles the hub 2. The small coil springs 6 are disposed between the sub-plate 5 and the hub 2 so as to limit a relative rotation between them. The large coil springs 7 are disposed between the plates 3 and 4 and the sub-plate 5 so as to limit a relative rotation between them. The friction generating mechanism 8 is designed to generate a predetermined hysteresis torque when the hub 2 rotates relative to the plates 3 and 4.

Figure 2:
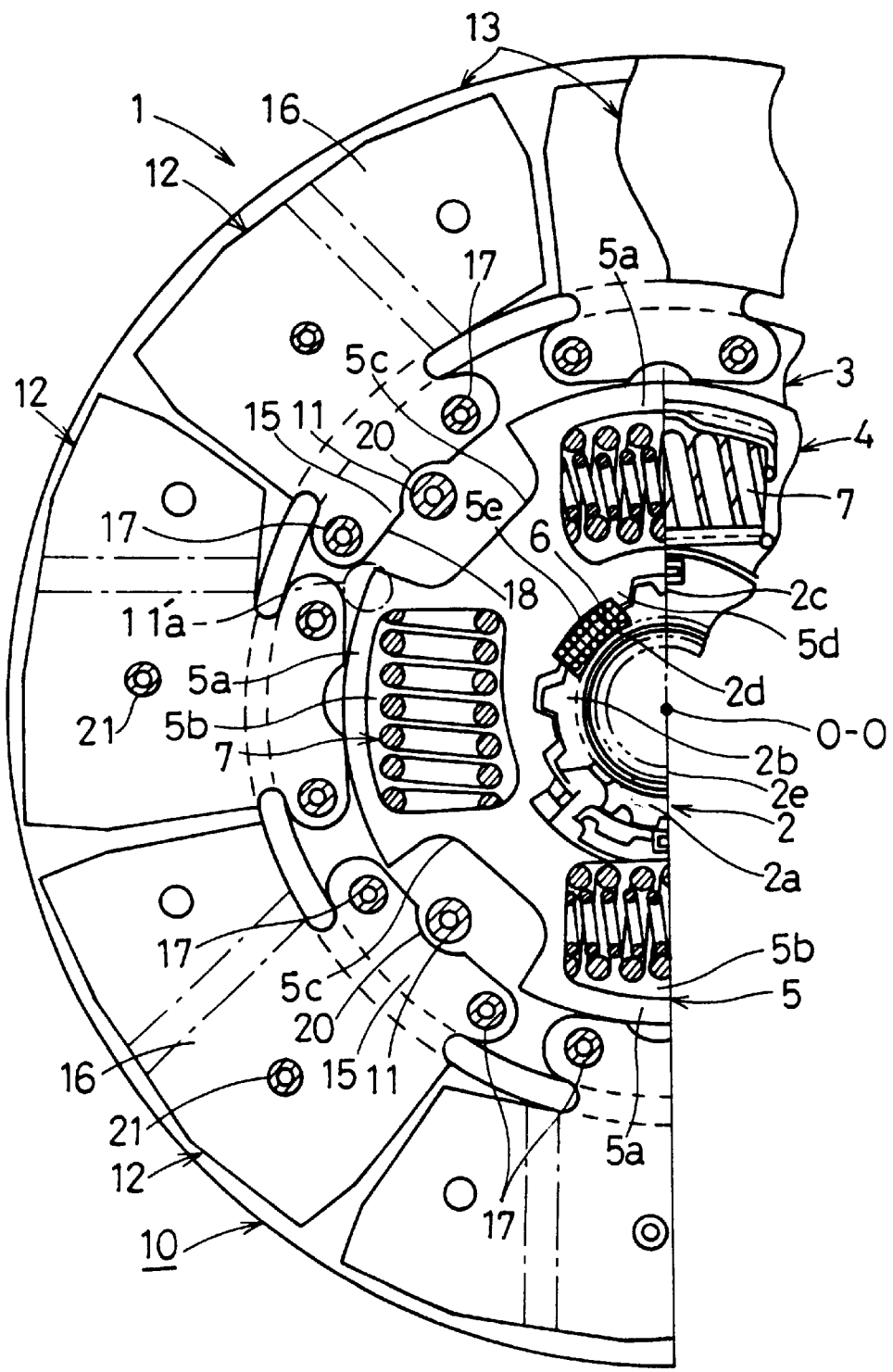
FIG. 2 is a partial side elevational view of a clutch disk assembly illustrated in FIG. 1 with selected portions removed for the purpose of illustrating selected parts of the clutch disk assembly.

The hub 2 is disposed at the center of the clutch disk assembly 1. The hub 2 is connected to the input shaft of the transmission (not shown) in a conventional manner as explained below. The hub 2 basically includes a cylinder like boss 2a extending in an axial direction, and a flange 2b formed at the outer circumference of the boss 2a. As shown in FIG. 2, the flange 2b of the hub 2 has a plurality of radially extending projections 2c, which are formed at equal spaced apart intervals in a circular direction at the outer circumference of the flange 2b. The outer circumference of the flange 2b also has a pair of cutouts 2d formed therein. The cutouts 2d receive the two small coil springs 6 in a circular direction. In other words, both ends of the small coil springs 6 engage the ends of the cutouts 2d. The cutouts 2d are formed at two radially opposite positions of the flange 2b.

At the inner circumference of the boss 2a, a spline hole 2e is formed that is designed to be connected with the splines of the input shaft (not shown) of the transmission. Thus, the hub 2 is non-rotatably coupled to the input shaft (not shown) of the transmission.

The sub-plate 5 is disposed on the outer circumferential side of the flange 2b of the hub 2. The sub-plate 5 is a disk-shaped plate. The sub-plate 5, as shown in FIG. 2, has four protrusions 5a extending outwardly in a radial direction. Each of the protrusions 5a has an arc shaped window hole or opening 5b which extends in a circular direction about the center of the hub 2. The sub-plate 5, as shown in FIG. 2, also has four outside cutouts 5c with each of the cutouts 5c being formed between two adjacent protrusions 5a in a circular direction. The sub-plate 5 also has a plurality of inside protrusions 5d, which are formed at the position of the inner circumference of the sub-plate 5 that corresponds to a part between the protrusions 2c of the hub 2. A predetermined gap is provided in a circular direction between the projection 2c and the inside protrusion 5d. The sub-plate 5 also has two inside cutouts 5e formed at opposite positions on the inner circumference of the sub-plate 5 that corresponds to the cutout 2d of the hub 2. The small coil springs 6 are disposed within the cutout 2d and the inside cutout 5e for elastically coupling the sub-plate 5 to the hub 2 via the small coil springs 6.

The clutch plate 3 has four window holes or openings 3a arranged in a circular pattern. Window holes 3a are equally spaced apart from each other. Likewise, retaining plate 4 has four window holes or openings 4a are arranged in a circular pattern. Window holes 4a are equally spaced apart from each. The relative positions of the window holes 3a of the clutch plate 3 and the window holes 4a of the retaining plate 4 correspond to the window holes 5b of the sub-plate 5, respectively. The large coil springs 7 (elastic member) are disposed within the window holes 3a, 4a and 5b for elastically coupling the clutch plate 3 and retaining plate 4 to the sub-plate 5.

The friction generating mechanism 8 basically includes annular members disposed, respectively, in an axial direction between both inner circumferences of the clutch plate 3 and the retaining plate 4, and radially outward of the boss 2a.

The clutch plate 3 and the retaining plate 4 are disposed, respectively, on one side of the sub-plate 5 in an axial direction. The clutch plate 3 and the retaining plate 4 are rotatably disposed on the outer circumferential portion of the boss 2a of the hub 2. Both outer circumferences of the clutch plate 3 and the retaining plate 4 are fixedly coupled to each other by stop pins or connecting pins 11 (fixing member) extending in an axial direction of the disk. Preferably, four connecting pins 11 are disposed at equal intervals in a circular direction. The connecting pins 11 pass through the circularly middle portions of the outside cutouts 5c formed at the sub-plate 5.

As seen in FIG. 1, each of the connecting pins 11 has a body 11a, an inserted part 11b and a head 11c. The body 11a of each connecting pin 11 is held between the clutch plate 3 and the retaining plate 4. The inserted part 11b of each connecting pin 11 extends from the body 11a and penetrates the holes of the clutch plate 3 and the retaining plate 4. The head 11c of each connecting pin 11 is disposed outside of each of plates 3 and 4. In other words, the inserted parts 11b and the heads 11c function to fix the connecting pins 11 to the plates 3 and 4. Four holes 3c are formed in the clutch plate 3 at equal intervals in a circular direction. The inserted parts 11b of the connecting pins 11 are inserted into these four holes 3c of plate 3.

The functions of the connecting pins 11 are as follows. First, the connecting pins 11 function to fix the clutch plate 3 and the retaining plate 4 to each other. Second, the connecting pins 11 function to determine the space in an axial direction between both plates 3 and 4. Third, the connecting pins 11 function to limit a torsion angle between the plates 3 and 4 and the sub-plate 5.

At the outer circumference of the clutch plate 3, a friction connecting part 10 is disposed. The friction connecting part 10 basically includes a plurality of cushioning plates 12 and two pieces of friction facings 13 (annular friction members). The cushioning plates 12 of the clutch plate 3 are annularly disposed in a circular pattern around the outer periphery of the clutch plate.

Each of the cushioning plates 12 is fixedly coupled to the side face of the clutch plate 3 on the transmission side (right side in FIG. 1). Each cushioning plate 12 includes an installation part 15 and a cushioning part 16. The cushioning part 16 extends outwardly in a radial direction from the installation part 15.

Each of the cushioning parts 16 extends in a circular direction of the disk and has wavy configuration portions lying in different circular planes. The friction facings 13 are fixedly coupled on both faces of the cushioning parts 16 by rivets 21.

Figure 3:
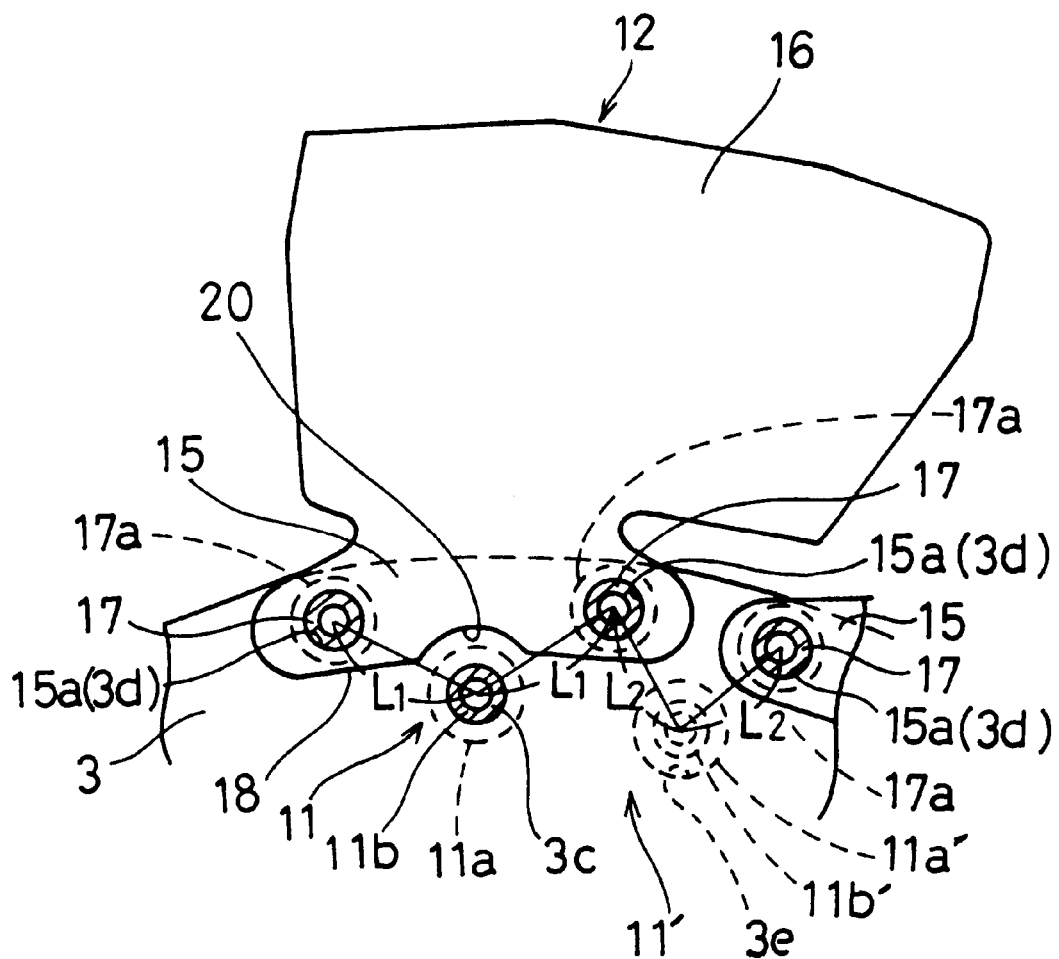
FIG. 3 is an enlarged, partial side elevational view of a selected portion of the clutch disk assembly illustrated in FIG. 1 in which selected parts have been removed.

As shown in FIG. 3, each installation part 15 extends in a circular direction from the disk. Also the end parts of each of the installation parts 15 are arranged in a circular direction, and are fixedly coupled to the outer circumference of the side face of the clutch plate 3 on the sub-plate 5 side by the rivets 17. In particular, two holes 15a are formed in each of the installation parts 15, which are apart in a circular direction. In addition, the clutch plate 3 has a plurality of holes 3d, which are formed at the outer peripheral portion of the clutch plate 3. These holes 3d are arranged in a circular pattern and correspond to the holes 15a in the installation parts 15 to secure each of the cushioning plates 12 thereto by the rivets 17. The rivets 17 are inserted into the holes 15a of each of the installation parts 15 to secure each of the cushioning plates 12 to the side face of the clutch plate 3 on the transmission side (right side in FIG. 1).

The inner circumferential edge 18 of each installation part 15 extends roughly in a circular direction or tangent direction of the disk. A cutout 20 with an arc-like shape is formed at the circularly middle portion of the inner circumferential edge 18. In other words, the circularly middle portion of the inner circumferential edge 18 is spaced far away from the center of the disk (line O—O) in a radial direction than the ends (the most radially inner edge) of the installation part 15.

The above-mentioned connecting pin 11 is located inwardly in a radial direction from the cutout 20. At least a part of the connecting pin 11 is located more outward in a radial direction than both ends (the most radially inner edge) of the inner circumferential edge 18 of the installation part 15. In particular, the end face of the body 11a of the connecting pin 11 is seated on the clutch plate 3 within the cutout 20. Also the radially outside part of the outer circumferential face of the connecting pin 11 is located within the cutout 20. The radially outside part of the outer circumferential face of the connecting pin 11 is located farther outwardly in a radial direction than both ends (the most radially inner edge) of the inner circumferential edge 18. In addition, the location of the connecting pin 11 in a circular direction is between two rivets 17 of the corresponding installation part 15 in a circular direction. According to the above-mentioned structure, the connecting pin 11 can be disposed as outwardly as possible in a radial direction, without interfering with the cushioning plate 12. Radially outside edges of the outer circumferential faces of the bodies 11a of the connecting pins 11 are located more outward in a radial direction than the radially inside edge of the outer circumferential faces of the heads 17a of the rivets 17.

The operation of the clutch disk assembly 1 will now be described as follows. When a pressure plate (not shown in Figures) presses the friction connecting part 10 against a flywheel (not shown in the Figures), a torque from the flywheel on the engine side is transmitted to the friction connecting part 10. This torque is also transmitted to the clutch plate 3 and the retaining plate 4 via the friction facings 13 and the cushioning plates 12. The torque is further transmitted to the hub 2 via the large coil springs 7, the sub-plate 5 and the small coil springs 6, and then is further transmitted to the input shaft of the transmission side (not shown in Figures).

In the above-mentioned operation, when the friction connecting part 10 is pressed against the flywheel, the wavy cross sections of the cushioning parts 16 of the cushioning plates 12 are flattened out. Consequently, a bending load is applied to the installation parts 15 in an axial direction of the clutch. This load is transmitted to the clutch plate 3 via the rivets 17. In the above-mentioned structure, the connecting pins 11 are located apart from the rivets 17. Therefore, the portion of the clutch plate 3 of which the rigidity increases due to a caulking of the connecting pin 11 is separated from the installation part of the rivets 17. As a result, according to the bending load transmitted from the installation part 15 to the clutch plate 3 via the rivets 17, portions of the clutch plate 3 near the rivets 17 can bend following the bending of the installation part 15. Therefore, since the present structure is different from the conventional one in which the clutch plate is very hard to bend around the rivets, a large local stress is not generated around the rivets 17 at the installation parts 15 of the cushioning plates 12.

By the way, in the prior art structure the connecting pins 11' (shown in FIGS. 2 and 3 in broken lines) are located as outward as possible in a radial direction as shown in FIG. 2 and 3. This results in the prior art connecting pins 11' being located between adjacent installation parts 15. Therefore, since it is disposed between the arc-like edge parts of two adjacent installation parts 15 in a circular direction, a portion of the clutch plate 3 around the rivet installing hole is hard to bend while affected by the connecting pin 11a'. If the structure of the present invention is compared with the conventional one in FIG. 3, it is apparent that the hole 3c of the clutch plate 3 of the present invention is located more outward in a radial direction than the prior art hole 3e. Moreover, the distance between both centers of the hole 3c and the hole 15a of the cushioning plate 12 (and the hole 3d) is longer than that between both centers of the hole 3e and the hole 15a of the cushioning plate 12 (L1>L2).

In the above-mentioned operation, when the large coil springs 7 are compressed by a force corresponding to a transmitted torque, the plates 3 and 4 rotate relatively against the sub-plate 5. When the rotation angle (torsion angle) reaches a predetermined amount, the connecting pins 11 contact the edge of the outside cutouts 5c of the sub-plate 5, resulting in stopping the further relative rotation between them. During this operation the load which is applied from the connecting pins 11 to the plates 3 and 4 or the sub-plate 5 is small because the connecting pins 11 are disposed outward in a radial direction as described above. Therefore, the damage or deformation of the plates 3 and 4 or the sub-plate 5 can be prevented certainly.

THE EFFECT OF THE INVENTION

According to the present invention, in a clutch disk assembly with a plurality of cushioning plates 12, each connecting pin 11 (fixing portion) is spaced apart from two rivet installing holes 3d which are used to coupled one installation part 15 of a cushioning plate 12. Each connecting pin 11 is also disposed as outwardly as possible in a radial direction. Therefore, this arrangement prevents the rigidity of a portion of the clutch plate 3 near the rivets 17 in the clutch plate 3 from increasing. As a result, a large local stress is prevented at the installation parts 15 of the cushioning plates 12, resulting in prevention of the damage of the installation parts 15.

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A clutch disk assembly comprising;
   a pair of annular friction members;
   a plurality of cushioning plates disposed side by side in a circular pattern relative to said annular friction members and located between said annular friction members, each of said cushioning plates including a cushioning part disposed between and coupled to said annular friction members, and an installation part formed on an inner circumferential side of said cushioning part, each of said installation part having an inner circumferential edge and two holes spaced apart in a circular direction relative to said annular friction members;
   first and second annular plate members disposed radially inward of said annular friction members and being spaced apart from each other in an axial direction at a predetermined interval, each of said first and second annular plate members having an outer circumferential portion;
   a plurality of rivets located in said holes of said installation parts to fixedly couple said cushioning plates to one of said outer circumferential portions of one of said first and second annular plate members;
   a plurality of fixing members extending in an axial direction and fixedly coupled to said outer circumferential portions of said first and second plate members, said fixing members being arranged in a circular pattern relative to said annular friction member with one of said fixing members being located between said two holes of said each cushioning plates, and at least a portion of each of fixing members being located farther outwardly in a radial direction than at least an innermost portion of each of said inner circumferential edges of said installation parts of said cushioning plates; and
   a hub coupled to said first and second annular plate members for transmitting torque input from said first and second plate members,
      each of said inner circumferential edges of each of said installation parts extending in a circular direction, and having a cutout extending outwardly in a radial direction at a circularly median portion of said inner circumferential edges, and each of said fixing members is at least partially located within one of said cutouts.

2. A clutch disk assembly as set forth in claim 1, wherein each of said fixing members comprises a body located between said first and second annular plate members in an axial direction, and first and second fixing parts extending from said body to fixedly couple said first and second annular plate members together.

3. A clutch disk assembly as set forth in claim 2, wherein a portion of each of said bodies is located farther outward in a radial direction than said innermost portion of said inner circumferential edges of said installation parts of said cushioning plates.

4. A clutch disk assembly as set forth in claim 1, further comprising
   a sub-plate located between said first and second annular plate members, said sub-plate being coupled to said hub to rotate therewith.

5. A clutch disk assembly as set forth in claim 4, wherein said sub-plate has cutouts for receiving said fixing members therein, said cutouts engage said fixing members to limit relative rotational movement of said sub-plate relative to said first and second annular plate members.

6. A clutch disk assembly as set forth in claim 5, wherein at least one elastic member is coupled between said sub-plate and at least one of said first and second annular plate members.

7. A clutch disk assembly as set forth in claim 6, wherein said elastic member includes a plurality of springs.

8. A clutch disk assembly as set forth in claim 6, wherein said sub-plate is elastically coupled to said hub to allow limited rotational movement.

9. A clutch disk assembly as set forth in claim 1, wherein each of said cushioning parts of said cushioning plates has a first section lying in a first plane and a second section lying in a second plane which is different from said first plane.

10. A clutch disk assembly as set forth in claim 9, wherein said first sections of said cushioning parts of said cushioning plates are fixedly coupled to a first of said annular friction members, and said second sections of said cushioning plates are fixedly coupled to a second of said annular friction members.

11. A clutch disk assembly as set forth in claim 10, wherein
   said installation parts of said cushioning plates extend radially inward from said first sections of said cushioning parts.

12. A clutch disk assembly as set forth in claim 1, further comprising
   a sub-plate located between said first and second annular plate members, said sub-plate being coupled to said hub to rotate therewith.

13. A clutch disk assembly as set forth in claim 12, wherein said sub-plate has cutouts for receiving said fixing members therein, said cutouts engage said fixing members to limit relative rotational movement of said sub-plate relative to said first and second annular plate members.

14. A clutch disk assembly as set forth in claim 13, wherein at least one elastic member is coupled between said sub-plate and at least one of said first and second annular plate members.

15. A clutch disk assembly as set forth in claim 14, wherein said elastic member includes a plurality of springs.

16. A clutch disk assembly as set forth in claim 14, wherein said sub-plate is elastically coupled to said hub to allow limited rotational movement.

17. A clutch disk assembly as set forth in claim 1, wherein said hub has a center bore with splines formed therein.

18. A clutch disk assembly as set forth in claim 1, wherein each of said cushioning parts of said cushioning plates has a first section lying in a first plane and a second section lying in a second plane which is different from said first plane.

19. A clutch disk assembly as set forth in claim 18, wherein said first sections of said cushioning parts of said cushioning plates are fixedly coupled to a first of said annular friction members, and said second sections of said cushioning plates are fixedly coupled to a second of said annular friction members.

* * * * *